United States Patent [19]

Hini et al.

[11] Patent Number: 5,209,055
[45] Date of Patent: May 11, 1993

[54] STEP BEARING FOR THE SHAFT OF A SPINNING ROTOR

[75] Inventors: Eugen Hini, Kosching; Erich Bock, Wettstetten; Eberhard Grimm, Ingolstadt, all of Fed. Rep. of Germany

[73] Assignee: Schubert & Salzer Maschinenfabrik Aktiengesellschaft, Ingolstadt, Fed. Rep. of Germany

[21] Appl. No.: 646,757

[22] PCT Filed: May 4, 1990

[86] PCT No.: PCT/DE90/00320

§ 371 Date: Jan. 2, 1991

§ 102(e) Date: Jan. 2, 1991

[87] PCT Pub. No.: WO90/13690

PCT Pub. Date: Nov. 15, 1990

[30] Foreign Application Priority Data

May 5, 1989 [DE] Fed. Rep. of Germany ....... 3914777

[51] Int. Cl.$^5$ ............................................. D01H 4/12
[52] U.S. Cl. ..................................... 57/406; 384/603; 384/610; 384/611
[58] Field of Search ................. 57/400, 404, 406, 407, 57/414; 384/610, 603, 611, 616

[56] References Cited

U.S. PATENT DOCUMENTS

| 931,069 | 8/1909 | Larrabee | 384/610 |
|---|---|---|---|
| 2,269,606 | 1/1942 | Spear | 384/610 X |
| 3,311,433 | 3/1967 | Graham et al. | 384/610 |
| 3,861,132 | 1/1975 | Stahlecker et al. | 57/407 |
| 3,875,732 | 4/1975 | Ellingham | 57/406 |
| 4,022,008 | 5/1977 | Pimiskern et al. | 57/414 |
| 4,186,548 | 2/1980 | Stahlecker | 57/406 |
| 4,221,439 | 9/1980 | van Ditshuizen | 57/406 X |
| 4,516,396 | 5/1985 | Stahlecker et al. | 57/407 |

FOREIGN PATENT DOCUMENTS

| 2833134 | 2/1980 | Fed. Rep. of Germany | 57/406 |
|---|---|---|---|
| 690282 | 4/1953 | United Kingdom | 384/610 |

Primary Examiner—Joseph J. Hail, III
Attorney, Agent, or Firm—Dority & Manning

[57] ABSTRACT

In an open-end spinning device with a spinning rotor whose shaft bears axially upon the ball of a step bearing, said step bearing is designed for the attenuation of axial oscillations and shocks of the spinning rotor. The bearing includes an elongated housing provided with a ball supporting member and a resilient member.

3 Claims, 3 Drawing Sheets

STEP BEARING FOR THE SHAFT OF A SPINNING ROTOR

BACKGROUND OF THE INVENTION

The instant invention relates of an open-end spinning device and more particularly to an axial bearing for a shaft of the spinning rotor.

Open-end spinning devices with a step bearing are known from U.S. Pat. No. 3,951,479 and U.S. Pat. No. 4,106,192. In open-end spinning devices in which the shaft of the spinning rotor bears on a rotatable ball it must be ensured that the oscillations of the machine are transmitted to the ball so that the latter is prompted to rotate in tune. U.S. Pat. No. 3,951,479 shows a step bearing in FIG. 4 in which oscillations are transmitted via the oscillation support 44 in the axial sense of the spinning rotor to the ball.

In U.S. Pat. No. 4,106,192 the seating of the ball is effected by a bolt which is divided by slits into oscillator tuning-fork-like oscillators in order to transmit the oscillations of the machine to the ball.

In the operation of an open-end spinning rotor sudden axial oscillations of the shaft occur and result in a high degree of wear of the contact surfaces of shaft and ball in the conventional step bearings. Furthermore the spinning rotor can impact against the wall of its rotor housing and damage it.

It has been attempted to attenuate the oscillations of the shaft by means of springs. This bearing has the disadvantage that the shaft cannot be positioned precisely in axial direction and this leads to an unsteady operation. It does not ensure that the ball rotates in tune, so that stoppage of the ball occurs. When tuning-fork-like oscillators are used, axial damping of the rotor shaft is not possible. This leads to damage of the spinning device. The open-end spinning devices according to the state of the art cannot favorably influence the axial oscillating movements and shocks which occur during the operation of spinning rotors. The shown elastic supports of the ball are not suited for this. The elastic bearings lead to a stoppage of the ball and thereby to bearing damage.

SUMMARY OF THE INVENTION

It is the object of the instant invention to design an open-end spinning device wherein a ball forming part of an axial bearing is axially damped with respect to the shaft.

Thanks to the intercalation of a damping element between the ball and its bearing support against the machine the axial oscillation of the rotor shaft are damped so that knocks against the thrust bearing and thereby wearing of the step bearing end of the shaft end are eliminated. By damping axial knocks the risk of the rotor impacting against the walls of the rotor housing is furthermore avoided. A simple placement of a damping element between the ball and its bearing point on the machine would result in attenuating the oscillations of the machine to such an extent that a rotation of the ball in tune with the shaft would not take place. Intermittent or continuous stoppage of the ball and resulting damage to the shaft and ball would occur. The embodiment of the step bearing according to the instant invention attenuates shocks and oscillations in the axial direction of the shaft and nevertheless ensures in-tune rotation of the ball as well as precise axial positioning of the spinning rotor. Due to the fact that the ball is in contact in radial direction with the bearing point on the machine in such manner that the oscillations of the machine in radial direction of the shaft are transmitted to the ball, for instance via the cap, it is ensured that the latter is certain to rotate in tune with the shaft. These oscillations suffice to stimulate the ball. Good axial damping of the shaft and at the same time stimulation of the ball are achieved. The shock-like oscillations of the shaft can be attenuated by means of the step bearing according to the instant invention. Impact of the spinning rotor against the cover of the rotor and damage to the step bearing are thereby avoided. A precise axial positioning of the spinning rotor is possible.

The position of the ball in a cap makes it easy for the machine oscillations which cause the ball to rotate to be transmitted to it. The ball can be held securely and the side of the cap away from the ball is a good contact surface for the damping element.

BRIEF DESCRIPTION OF THE DRAWINGS

The invention is described below in further detail through drawings in which.

DESCRIPTION OF THE PREFERRED EMBODIMENTS

Figure 1:
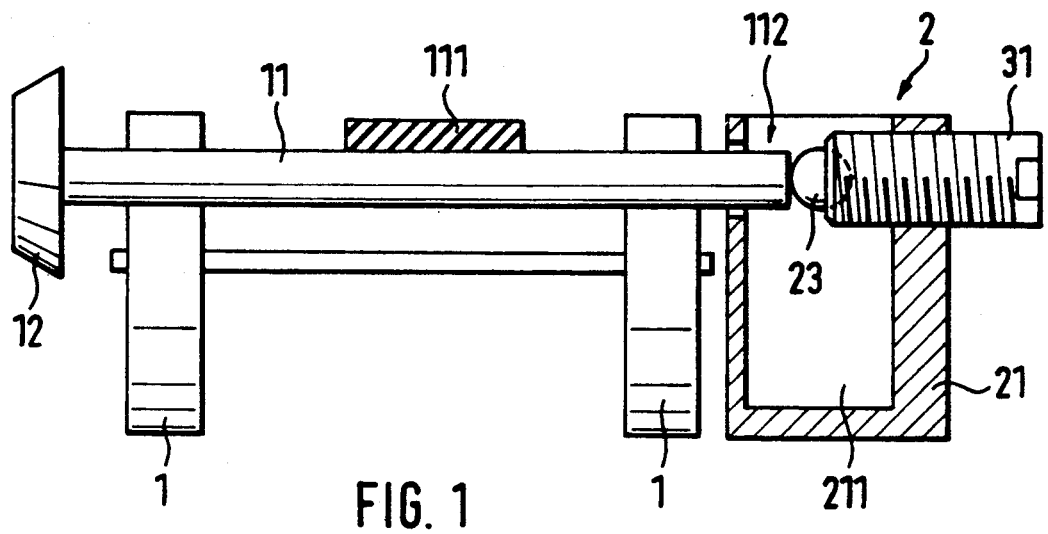
FIG. 1 is a side view of a thrust bearing of a spinning rotor constructed in accordance with the instant invention.

FIG. 1 shows a shaft 11 of a spinning rotor 12, supported in the nip of supporting disks 1. The shaft 11 is driven by means of a tangential belt 111. Due to the pitch of the supporting disks a force which is received by a step bearing 2 acts on shaft 11 in direction of its free end 112. This step bearing consists of the bearing housing 21 into which an attachment screw 31 extends. A ball 23 is inserted in one end of the screw 31. The ball 23 receives the axial forces acting upon shaft 11. It is lubricated in a known manner by means of a wick (not shown) which reaches into the lubrication housing 211 which is filled with lubricant. A minimal offset of the shaft axle with respect to the ball causes the latter to rotate in tune, with its rotational speed being far lower than that of shaft 11.

The instant invention is not limited to the type of bearing and drive of the spinning rotor 12. It is for instance also applicable to the drive of a shaft by means of a friction disk which may be driven by an electrical motor. Also with shaft supports by means of fluid bearings and with supports in which the axial thrust of the shaft is achieved by other means, e.g. gravity.

Figure 2:
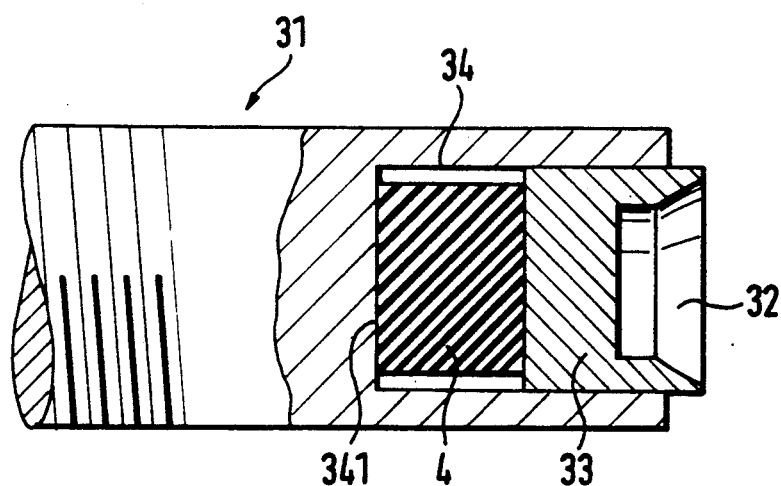
FIG. 2 is a side elevational view with a portion thereof in section illustrating a housing forming part of the thrust bearing constructed in accordance with the invention.

FIG. 2 shows an embodiment of the spur bearing according to the instant invention in which a cap 32 is part of a supporting element 33. The latter is installed in a bore 34 provided in the end of attachment screw 31. Between the supporting element 33 and the bottom 341 of the bore 34, a damping element 4 is installed. In FIG. 2 it consists of a rubber-like material with good damping properties which attenuates the axial oscillations of shaft 11 transmitted by the supporting element 33. The damping element 4 is built into bore 34 with radial clearance so that deformation of the rubber-like material in axial direction can be compensated by deformation in radial direction. One end of the damping element 4 is vulcanized to an inner end of the supporting element 33. The other end of damping element 4 is glued to the bottom 341 of bore 34. The two fitting processes are interchangeable as needed. By fixing the individual components, slaving of the cap 32 with the ball 23 is avoided.

The diameter of bore 34 and the diameter of the supporting element 33 are coordinated in such manner that an axial mobility of the supporting element 33 is still allowed while machine oscillations can still be transmitted to the cap 32 because the bearing element 33 is radially at least in part in contact with the walls of the bore by touching them. A constant contact over the entire surface is not necessary. However non-attenuated contact with at least part of the surface, or at least intermittent partial contact between the surface and the walls must be ensured. At least one of the two interacting metal surfaces is nickel-plated. Other coatings can also be used to prevent frictional corrosion. In order to prevent the supporting element 33 from getting jammed as it moves, it must have sufficient axial length in relation to its diameter.

By installing it in a bore of the attachment screw 31, the cap 32 can be positioned precisely together with the ball 23 to adjust the spinning rotor axially.

Figure 3:
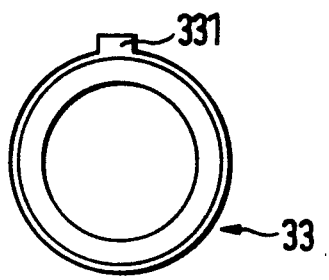
FIG. 3 is an end view of a modified form of a supporting element.

FIG. 3 shows a modified form for the supporting element 33 with a projection 331. The latter interacts with a groove in the wall of the bore of the support on the machine, thus preventing the cap 32 from twisting and slaving.

Figure 4:
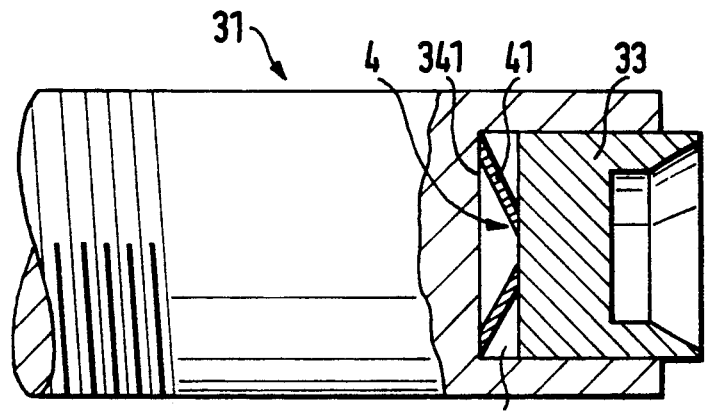
FIGS. 4 to 7 are side elevational views with a portion thereof being in section illustrating a housing for modified forms of the invention.

FIG. 4 shows still another modified form for the attachment screw 31 which is equipped with a annular disk 41 in form of a truncated cone serving as a damping element 4, installed in the bore 34 of attachment screw 31 and bearing the supporting element 33 axially with damping effect. The design of the supporting element 33 is as described in FIG. 2. The annular disk 41 is in form of a truncated cone. The contact surfaces of the annular disk 41 to bottom 341 and to the supporting element 33 are parallel to these surfaces so that the surface of contact is as large as possible. Attenuation results from sliding friction between annular disk and its contact surfaces during deformation of said annular disk. The contact surfaces of the annular ring 41 are hardened to avoid wear, as are the bottom 341 and the supporting element 33. The annular ring 41 has a clearance at its outer circumference in the bore 34 so that it may become deformed. The oscillations of the machine are transmitted to the bail 23 via the supporting element 33.

Figure 5:
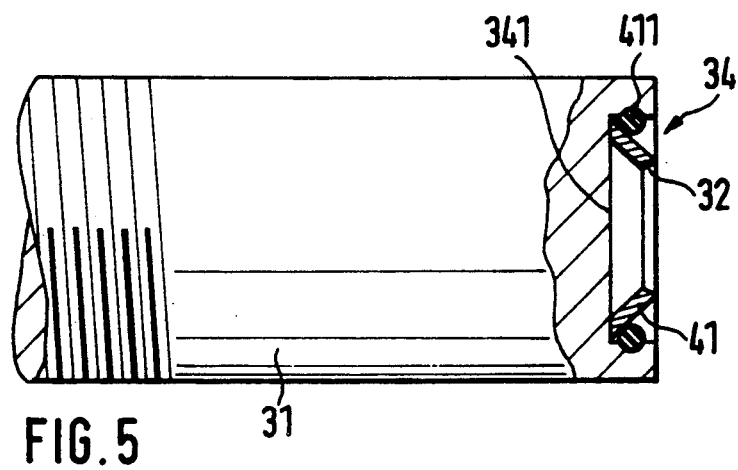

In still another embodiment shown in FIG. 5 the annular ring 41 in form of a truncated cone is made into a cap 32 on its side towards the spinning rotor in order to receive the ball 23. The circumference of the annular ring 41 is in contact with the wall of bore 34 near the bottom 341 so that oscillations of the machine can be transmitted to the ball. In order to improve the required deformation a slit is made in the circumferential line. It is also possible to make several slits in the circumference of the cone. But in that case only one of them may go all the way through, as the necessary one-piece construction would otherwise be lost. One slit gives the ring-shaped cap the shape of a sickle, several slits divide it into segments of a circular ring. The contact surfaces are hardened to reduce wear. To fix the annular ring 41, a O-ring 411 is provided in a groove of the wall of the bore 34.

Figure 6:
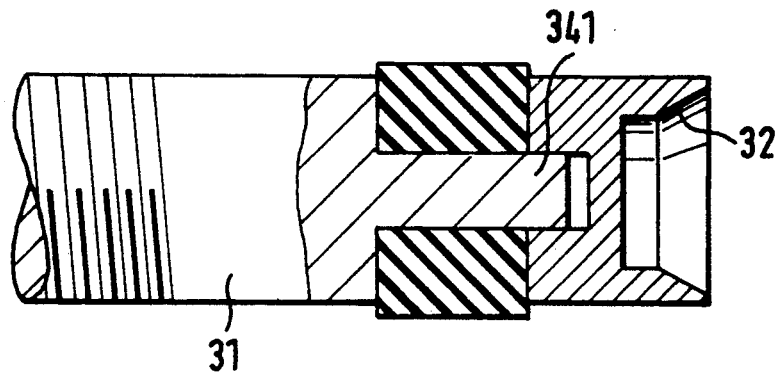

FIG. 6 shows still another modified form for an attachment screw 31 which has a mandril 341 instead of a bore, on which a tabular damping element 4 and the supporting element 33 are installed. Between the mandrel 341 and the supporting element 33 there is clearance in axial direction, the extent of this clearance limiting the axial mobility of the cap 32 since the mandrel 341 constitutes a stop (35) for the supporting element 33.

Figure 7:
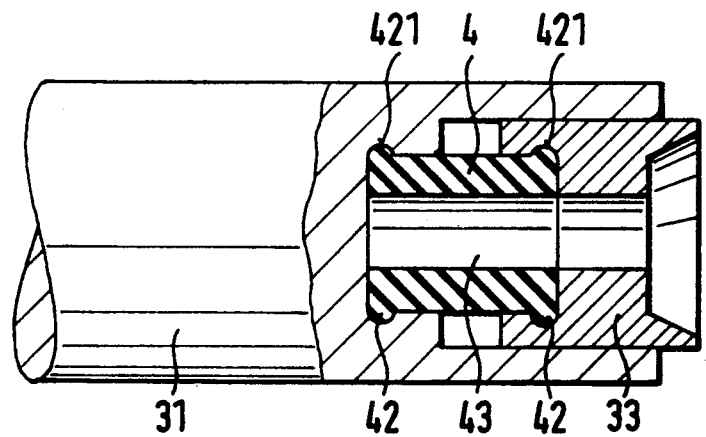

FIG. 7 shows still another modified step bearing constructed in accordance with the invention in which the damping element 4 is provided with two push-button-like beads interacting with the radial grooves 421 of the attachment screw 31 and of the supporting element 33 for the purpose of axial fixation. The damping element 4 has a recess 43. This makes it possible for it to become deformed. The deformability of the damping element 4 outward is limited since the beads 42 have little clearance in the grooves 421. Due to the recess 43, radial inward deformation can take place.

We claim:

1. A step bearing for use in an open-end spinning device having a plurality of spinning stations,
    a spinning rotor having a shaft extending rearwardly therefrom comprising:
    a ball,
    ball support means mounted on said spinning machine for supporting said ball and receiving oscillations from said spinning machine which cause said ball to rotate in said support means,
    an end of said rotor shaft engaging one side of said ball,
    resilient means formed of an elastomeric material for engaging said ball support means on a side opposite said shaft for axially damping any axial oscillations imparted to said ball by said shaft,
    said ball support means including,
    an elongated housing carried on a side of said ball opposite said shaft of said rotor,
    a tubular cylindrical bore provided in said housing having an open-end, a side wall and a bottom surface,
    said resilient means having first and second ends carried in said bore with said first end abutting said bottom surface of said tubular bore,
    a ball receiver carried in said bore in abutting relation with said second end of said resilient means, and
    said resilient means having a diameter less than the diameter of said cylindrical bore so that said resilient means when radially expanded by axial force imparted by said shaft is in a non-damping capacity in the radial direction.

2. The step bearing as set forth in claim 1 wherein said ball receiver is a cap.

3. The step bearing as set forth in claim 1 wherein said elongated housing is in the form of an attachment screw.

* * * * *